United States Patent [19]

Lincoln et al.

[11] Patent Number: 5,060,394
[45] Date of Patent: Oct. 29, 1991

[54] MEASURING APPARATUS WITH READOUT DISPLAY

[75] Inventors: Larry A. Lincoln, Milpitas; Nicholas Vrionis; Donald E. Pezzolo, both of Los Altos; James W. Pfeiffer, Santa Clara; Robert A. Wilk, Sierra Village; John D. Scheff, Milpitas, all of Calif.

[73] Assignee: Homestar International Inc., Pleasanton, Calif.

[21] Appl. No.: 341,030

[22] Filed: Apr. 20, 1989

[51] Int. Cl.⁵ ............................................. G01B 3/10
[52] U.S. Cl. ........................................ 33/763; 33/761; 33/765; 33/766
[58] Field of Search ................. 33/763, 762, 761, 765, 33/766, 767, 769, 772, 773, 775, 780; 200/11 DA, 11 TW

[56] References Cited

U.S. PATENT DOCUMENTS

| | | | |
|---|---|---|---|
| 2,853,564 | 9/1958 | Gahagan | 200/11 TW |
| 2,854,753 | 10/1958 | Caparros | 33/762 |
| 3,366,751 | 1/1968 | Capellari | 200/11 TW |
| 3,558,834 | 1/1971 | Zielke | 200/11 DA |
| 3,862,761 | 1/1975 | Conley | 33/761 |
| 4,031,360 | 6/1977 | Soule, Jr. . | |
| 4,143,267 | 3/1979 | Johnson et al. . | |
| 4,150,282 | 4/1979 | Aoki et al. . | |
| 4,161,781 | 7/1979 | Hildebrandt et al. . | |
| 4,164,816 | 8/1979 | Bergkvist . | |
| 4,181,848 | 1/1980 | Iwase . | |
| 4,181,960 | 1/1980 | Tateishi et al. . | |
| 4,185,390 | 1/1980 | Tateishi . | |
| 4,195,348 | 3/1980 | Kakutani . | |
| 4,242,574 | 12/1980 | Grant . | |
| 4,316,081 | 2/1982 | Washizuka et al. . | |
| 4,575,944 | 3/1986 | Lin . | |
| 4,587,738 | 5/1986 | Kang | 33/762 |
| 4,611,402 | 9/1986 | Yamamoto et al. . | |
| 4,642,899 | 2/1987 | Fass et al. | 33/763 |
| 4,658,134 | 4/1987 | Okumura | 33/762 |
| 4,747,215 | 5/1988 | Waikas . | |
| 4,779,211 | 10/1988 | March | 33/763 |

FOREIGN PATENT DOCUMENTS

2846915  5/1980  Fed. Rep. of Germany ........ 33/762

Primary Examiner—William A. Cuchlinski, Jr.
Assistant Examiner—C. W. Fulton

[57] ABSTRACT

A tape measure 20 includes a display window 24 for presenting a digital presentation of the measurement being made. The tape measure 20 includes an encoder 74 which provides for a combined absolute scale 95 and relative scale 105 for determining the measurement. Perforations 62 in the tape 26 are mated with pins 60 extending from a capstan 58 in order to cause the encoder 74 to send signals to a microprocessor 76. The microprocessor 76 processes the signal and displays the measurement.

28 Claims, 5 Drawing Sheets

MEASURING APPARATUS WITH READOUT DISPLAY

FIELD OF THE INVENTION

The present invention is related to a measuring device for determining a desired measurement and for providing an electronic readout of that measurement.

BACKGROUND OF THE INVENTION

There are a number of presently available measuring devices for determining the distance between two points. Many of these devices include tape measures with digital readouts of the measurement obtained. These tape measures generally include a extendable tape or blade and some mechanism for determining the amount of the blade which has been extended. This mechanism in many instances includes an optical encoder which is comprised of encoding indicia and an optical reader for determining the positioning of the encoding indicia. A great many of these tape measures count a relative number of intervals and determine the measurement by the count. Some of these devices include code such as bar codes which have unique indica for every location on the tape. Thus, by reading the code, the exact location on the tape can be determined.

Each of these measuring devices have disadvantages. For example, with respect to the devices that simply count indica, the higher the resolution the more indica must be condensed into a given space. Further, the more indica which must be counted, the slower the operation becomes and the more chance that an error can be introduced into the count.

With respect to codes which identify absolute locations, again the more resolution required, the more code that must be condensed into a given area.

Many of the above devices require that the code be placed on the blade itself. Such arrangements have distinct disadvantages in that through use, the code can become worn or can be covered by foreign matter such as for example, dirt, paint and the like.

Certainly a number of other devices exist for making measurements. Just by way of example, for purposes of determining longer distances over open ground, measuring wheels positioned at the end of a long handle, are available. The operator walks along and holds the handle so that the measuring wheel is in contact with the ground. The device then records the number of revolutions of the wheel and provides a reading of the distance covered.

SUMMARY OF THE INVENTION

The present invention is directed toward improving over the prior devices. The present invention comprises an apparatus for making a measurement, including a housing, a flexible tape or blade and means located in the housing for allowing the tape to be retracted into and extended from the housing. The apparatus further includes a capstan and means for rotatingly securing the capstan in the housing. Means are further, provided for operably engaging the tape with the capstan to cause the capstan to rotate with the retraction of the tape into the housing and the extension of the tape from the housing. An encoder is provided for determining the movement of the tape. Further means are provided for operably coupling the encoder to the capstan. The encoder means includes a plurality of coded conductors. Switch means are provided for contacting the conductors to cause a signal to be created. A processor means is connected to the switch means for determining a measurement dependent upon the signal from the switch means. Further means are provided for displaying the measurement.

The invention further includes an encoder having a plurality of semicircular conductors.

In a further aspect of the invention, the encoder includes both a relative scale and an absolute scale.

In another aspect of the invention, the tape includes perforations which are engaged by pins extending from the capstan in order to turn the capstan.

In yet another aspect of the invention, the encoder includes a relative scale having a plurality of first predetermined intervals which can be counted in order to determine a portion of a measurement, and a second absolute scale means for absolutely determining the position within any of the first predetermined intervals.

In another aspect of the invention, the absolute scale is comprised of a Gray Scale wherein pluralities of indica are established, and wherein each indica varies in only one position from the next indica. As a further aspect of the invention, an apparatus is provided for measuring distances where it may be impractical to use a tape measure. For example, when making field measurements, the invention includes a measuring apparatus which can be moved in engagement with and relative to the ground in order to measure the distance between two desired points. In such an arrangement, a capstan is caused to rotate as the apparatus moves relative to the ground. The capstan is associated with an encoder which provides a signal to a processor for determining the distance covered.

It is thus an object of the present invention to provide a simple and cost effective measuring apparatus which is accurate and not susceptible to contamination or measurement errors through extended use.

It is a further object of the present invention to provide an encoder having both an absolute and a relative scale so that the advantages of both can be obtained. With respect to an absolute scale, the possibilities of an inaccurate readings are greatly reduced as each position to be read has its own distinct code. With respect to combining an absolute scale with a relative scale, the problems associated with counting or miscounting the indica on a relative scale are minimized as the scale is used for determing a course position while the absolute scale is used for the determining the fine position.

DETAILED DESCRIPTION OF THE PREFERRED EMBODIMENT

Figure 1:
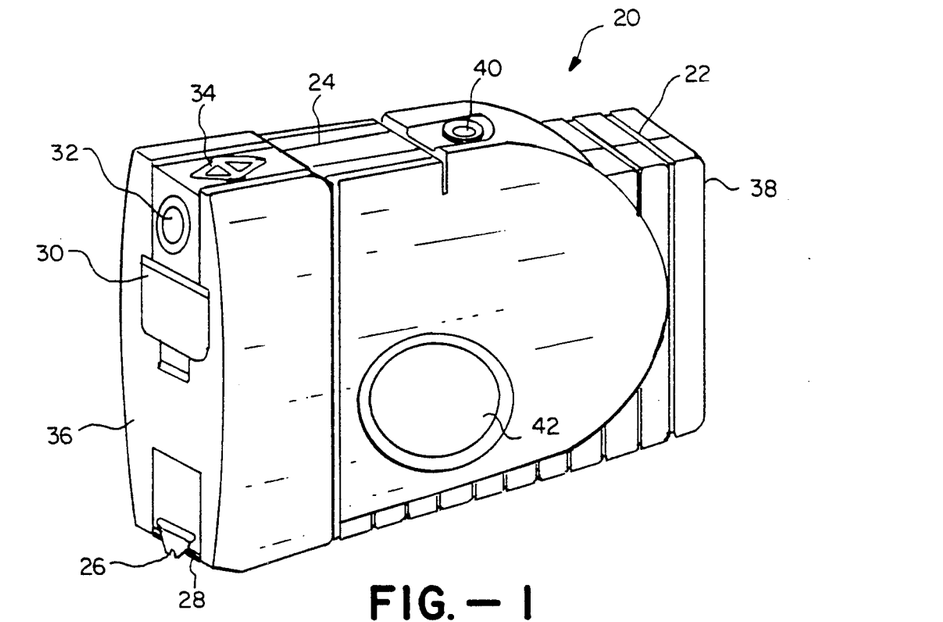
FIG. 1 is a prospective view of an embodiment of the invention.
Figure 2:
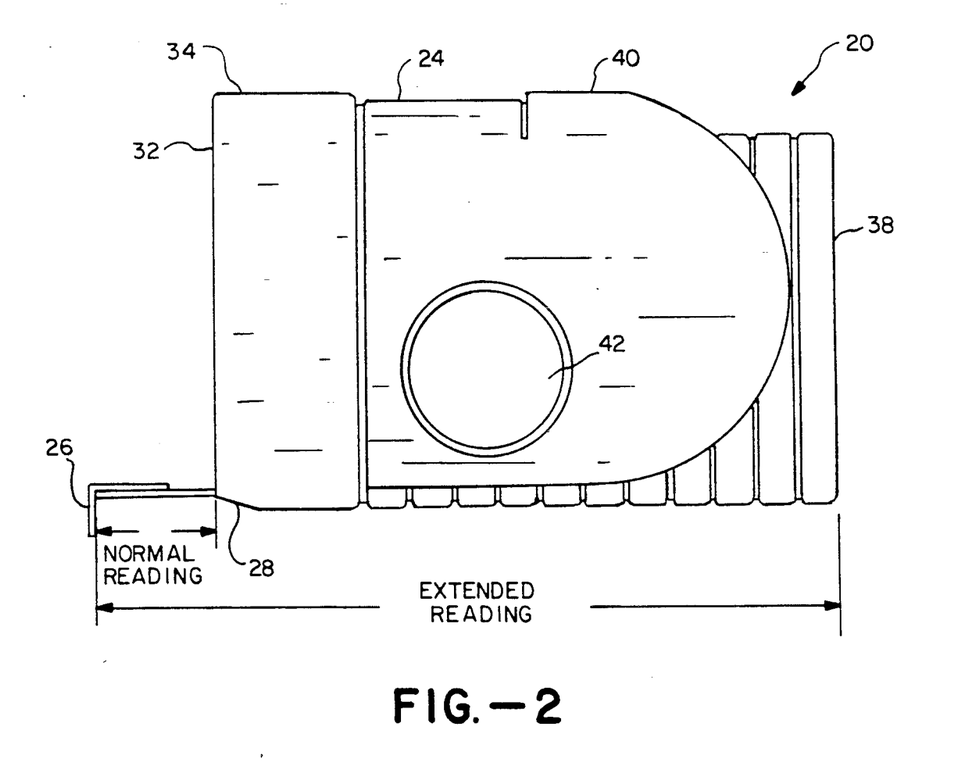
FIG. 2 is a front view of the embodiment of the invention of Fig. 1.

With the reference to the figures and in particular to FIG. 1, the tape measure 20 of an embodiment of the invention is depicted. The tape measure 20 includes a housing 22 with a display window 24 provided thereto. The display window 24 allows a digital display to be presented representative of the distance measured by the tape measure 20. The tape measure 20 includes a tape 26 which extends through a tape port 28. A door 30 for allowing access to a battery compartment (described below) is positioned above the tape port 28. The tape measure 20 includes a number of switches or mode selectors. These switches include the zero switch 32 which causes the distance displayed in the display window 24 to be zeroed out. Further, the tape measure 20 includes an extend switch 34 which allows a measurement to be made either from the front end 36 of the tape measure or the back end 38 of the tape measure. Tape measure 20 additionally includes a memory switch 40 which provides for the storage of a distance measured by the tape measure 20. As can further be seen in FIGS. 1 and 2, brake release button 42 is depicted. As will be explained hereinbelow, this brake release button 42 enables the tape to be unlocked from a position relative to the housing.

Figure 3:
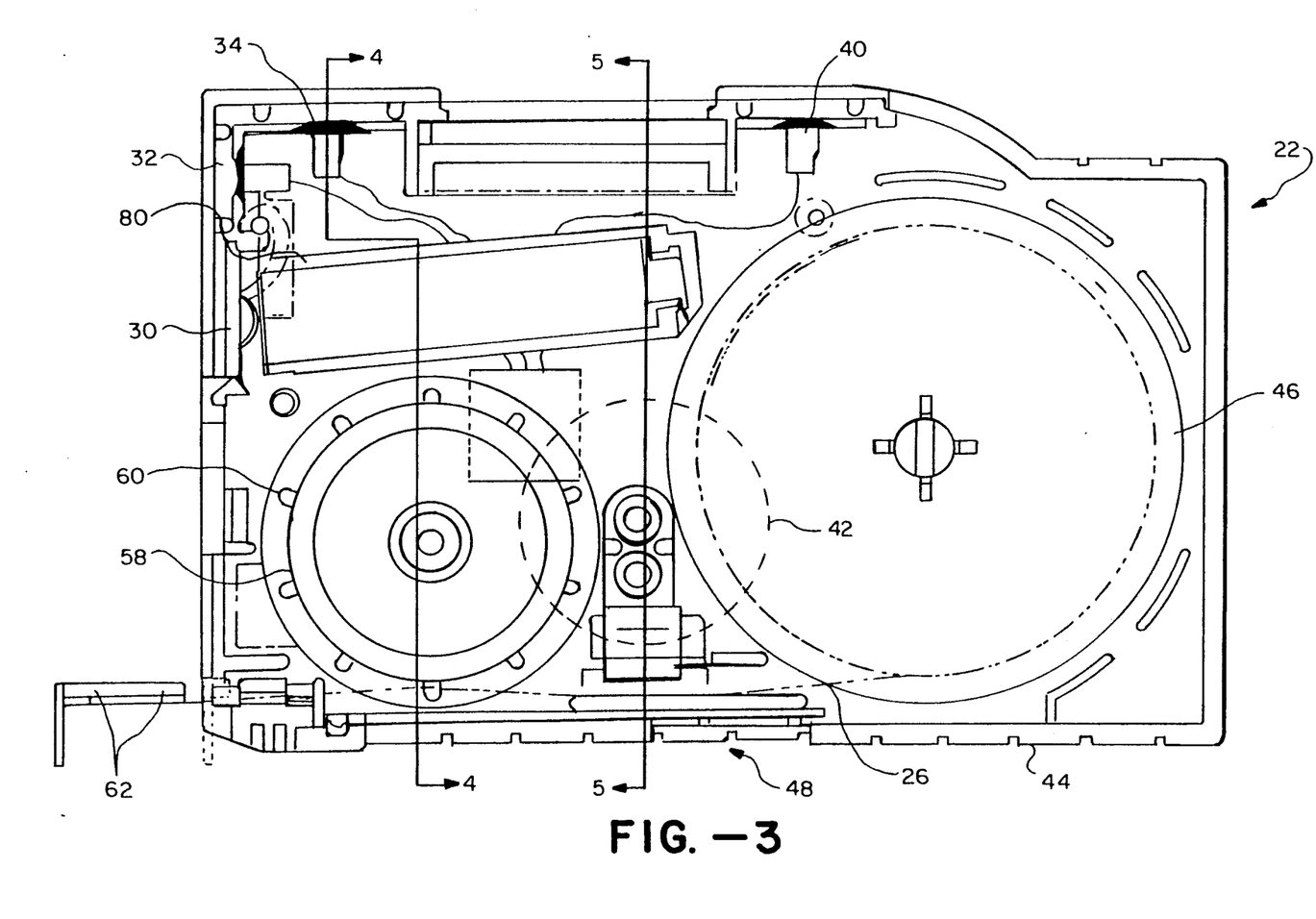
FIG. 3 is a front cutaway view of the embodiment of the invention of FIG. 2.

In FIG. 3, the side of the housing 20 has been outaway to reveal the internal mechanism of tape measure 20. Inside the housing 22, the tape 26 is directed along a path which is substantially parallel to the bottom 44 of the housing. The tape is stored about a spring loaded take-up wheel 46 which is mounted at the rear of the housing 22. The take-up wheel 46 is biased in such a manner such that when the tape 26 is released, the take-up wheel 46 will automatically urge the tape to be retracted into the housing 22 of the tape measure 20 and wound about the take-up wheel 46.

Figures 4, 4A, 5:
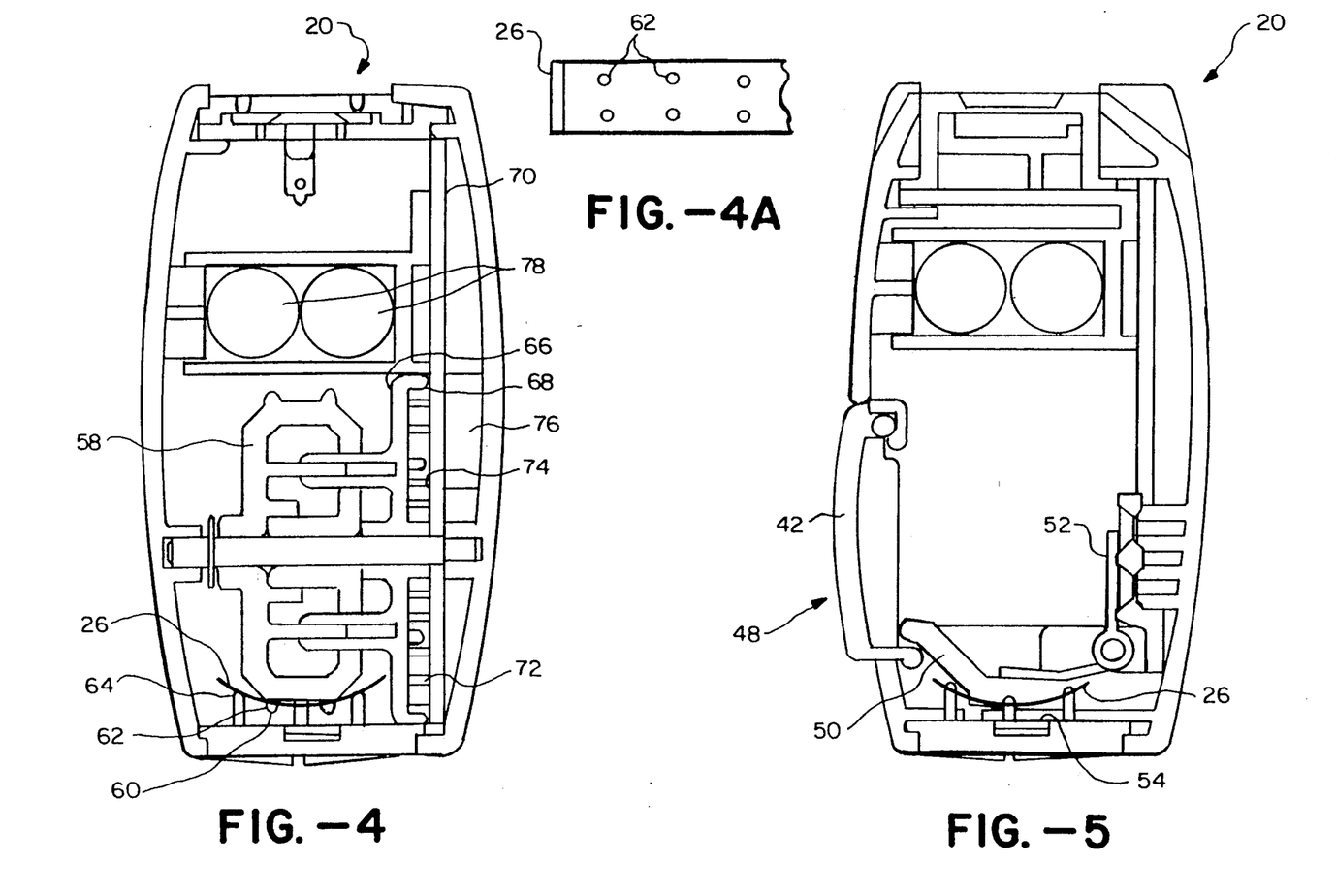
FIG. 4 is a side sectional view of an embodiment of the invention of FIG. 3.
FIG. 4a is a plan view of the tape of the embodiment of FIG. 3.
FIG. 5 is another side sectional view of an embodiment of the invention of FIG. 3.

As can be seen in FIGS. 3 and 5, a brake arrangement 48 is positioned along the bottom 44 of the housing 22. This brake arrangement 48 includes a brake 50 which is biased by a spring 52 in such a manner that the tape 26 is lockingly secured between the brake 50 and a platform 54. By pushing brake release button 42 inwardly, the brake 50 is urged out of engagement with the tape 26 allowing the tape to be either retracted into the housing or pulled out of the housing.

Located in the housing and immediately behind the tape port 28 is a capstan 58. The capstan is rotatingly mounted to the housing 22. Extending about the periphery of the capstan are a plurality of pins 60. These pins are designed to engagely receive perforations or bores 62 which are provided though the tape 26. Upstanding posts 64 provide a platform for ensuring that the tape 26 comes into contact with the capstan 58, and further ensuring that the pins 60 are positively and securely received into the perforation 62.

It is to be understood, that in a preferred embodiment, that the perforations 62 are substantially circular and that the pins are only long enough (as depicted to scale in FIG. 3) so that there is positive engagement between the capstan 58 and the tape 26. This is so that the perforations 62 do not have to be elongated in order to receive the pins 60 and so that the pins 60 do not enlarge the perforations in an elongated manner through usage. Such elongation would tend to introduce errors into the measurement.

Secured to the capstan 58 and rotatable therewith, is a mounting bracket 66 (FIG. 4). This mounting bracket 66 includes spacer pins such as spacer ring 68 which keep the mounting bracket 66 a preferred distance from a printed circuit board 70 in order to protect the below identified brushes. Also secured to the mounting bracket 66 are a plurality of contact brushes or switches, collectively referred to as switches or brushes 72. These brushes come into contact with an encoding pattern 74 (FIG. 7) which is printed on the backside of a printed circuit board 70. As will be explained below, it is through the contact of the brushes 72 with the encoding pattern 74 that determination of a distance is made. Mounted on the other side of the printed circuit board is a microprocessor 76.

In order to power the tape measure 20, several batteries 78 are received in a battery housing 80 which is provided with door 30 through which the batteries can be changed.

FIG. 3 also depicts as indicated above, the zero switch 32, the extend switch 34 and the memory switch 40. These switches are all communicated with the microprocessor 76 through appropriate leads as shown.

Figure 7:
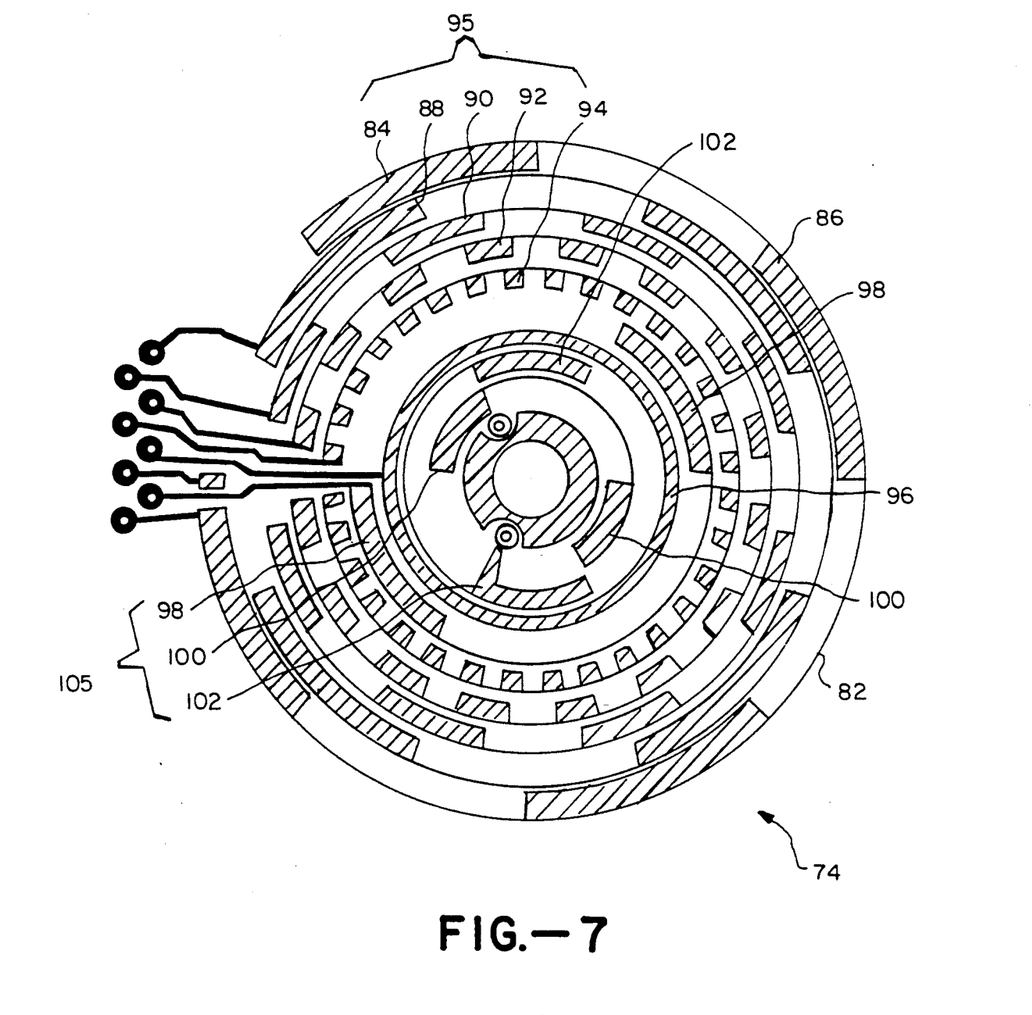
FIG. 7 is an embodiment of an encoder wheel of the invention.

In FIG. 7 it can be seen that the encoder pattern 74, in a preferred embodiment, includes a plurality of concentric coded, semicircular traces or conductors 82. The main portion of the conductors such as, for example, conductor 84, which comes in contact with a brush, is the semicircular portion shown with a heavy black line 86. The first five conductors 84, 88, 90, 92 and 94 comprise an absolute scale. For this scale, conductor 84 changes every one-half inch after one-half inch, conductor 88 changes every one-half inch after one-quarter inch, conductor 90 changes every one-quarter inch after one-eight inch, conductor 92 changes every one-eight inch after one-sixteenth inch, and conductor 94 changes every one-sixteenth inch after one-thirty-second inch. Encoder pattern 74 further includes a common conductor 96. Additionally, encoder pattern 74 includes three concentric coded semicircular conductors 98, 100 and 102 which comprise the relative measurement scale.

In a preferred embodiment, the absolute measurement scale can be comprised of a Gray Scale as demonstrated by Table 1 below.

TABLE 1

| | |
|---|---|
| 00000 | 0" |
| 00001 | 1/32" |
| 00011 | 1/16" |
| 00010 | 3/32" |
| 00110 | ⅛" |
| 00111 | 5/32" |
| 00101 | 3/16" |
| 00100 | 7/32" |
| 01100 | ¼" |
| 01101 | 9/32" |
| 01111 | 5/16" |
| 01110 | 11/32" |
| 01010 | ⅜" |
| 01011 | 13/32" |
| 01001 | 7/16" |
| 01000 | 15/32" |
| 11000 | ½" |
| 11001 | |
| 11011 | |
| 11010 | |
| 11110 | |
| 11111 | |
| 11101 | |
| 11100 | |
| 10100 | |
| 10101 | |
| 10111 | |

TABLE 1-continued

| | |
|---|---|
| 10110 | |
| 10010 | |
| 10011 | |
| 10001 | |
| 10000 | |
| 00000 | 1" |

A Gray Scale changes by one indica from sense location to sense location. Thus, as is shown in Table 1, going from one code to the next, only one of the zeros or ones changes. This results in less reading errors as the microprocessor can be programmed to know that only one contact should change at a time. Further, such an arrangement provides for an absolute scale in that when the five switches of the absolute scale are sensed in relation to the three switches of the relative scale, an absolute position can be obtained relative to the relative position. As can be seen in FIG. 7, the absolute scale of Table 1 repeats every 90°.

Further in a preferred embodiment, the relative conductors 98, 100 and 102 provide resolution to two inches. If one of the brushes 72 comes in contact with one of the conductors 98, 100, and 102 to provide a switch closure, followed by the switch closure of the next switch clock-wise from it, then clock-wise rotation is assumed. If the next closure is, however, in the counter clock-wise direction, then counter clock-wise rotation is assumed. Every transition from the switch associated with conductor 100 to a switch associated with a conductor 98, respectively substracts two inches from the measurement and every transition, in reverse from a switch associated with conductor 98, to a switch associated with conductor 100, respectively adds two inches to the measurement. Thus, the microprocessor 76, by counting these transitions as the tape is extracted from the housing can determine the measure to within a two inch interval. The reading from the relative scale 105 tells the microprocessor 76 in which quadrant of encoder 74 the absolute scale 95 is being read. Thus, the microprocessor knows whether the absolute scale is in the first or second inch of the two inch interval. With this information, the reading from the absolute scale 95 can be combined with the reading from the relative scale 105 to give a reading of the dimension within one-thirty second of an inch.

It is to be understood that there is great advantages to having the relative and absolute scales provided in a compact circular pattern protected by the housing.

Figure 6:
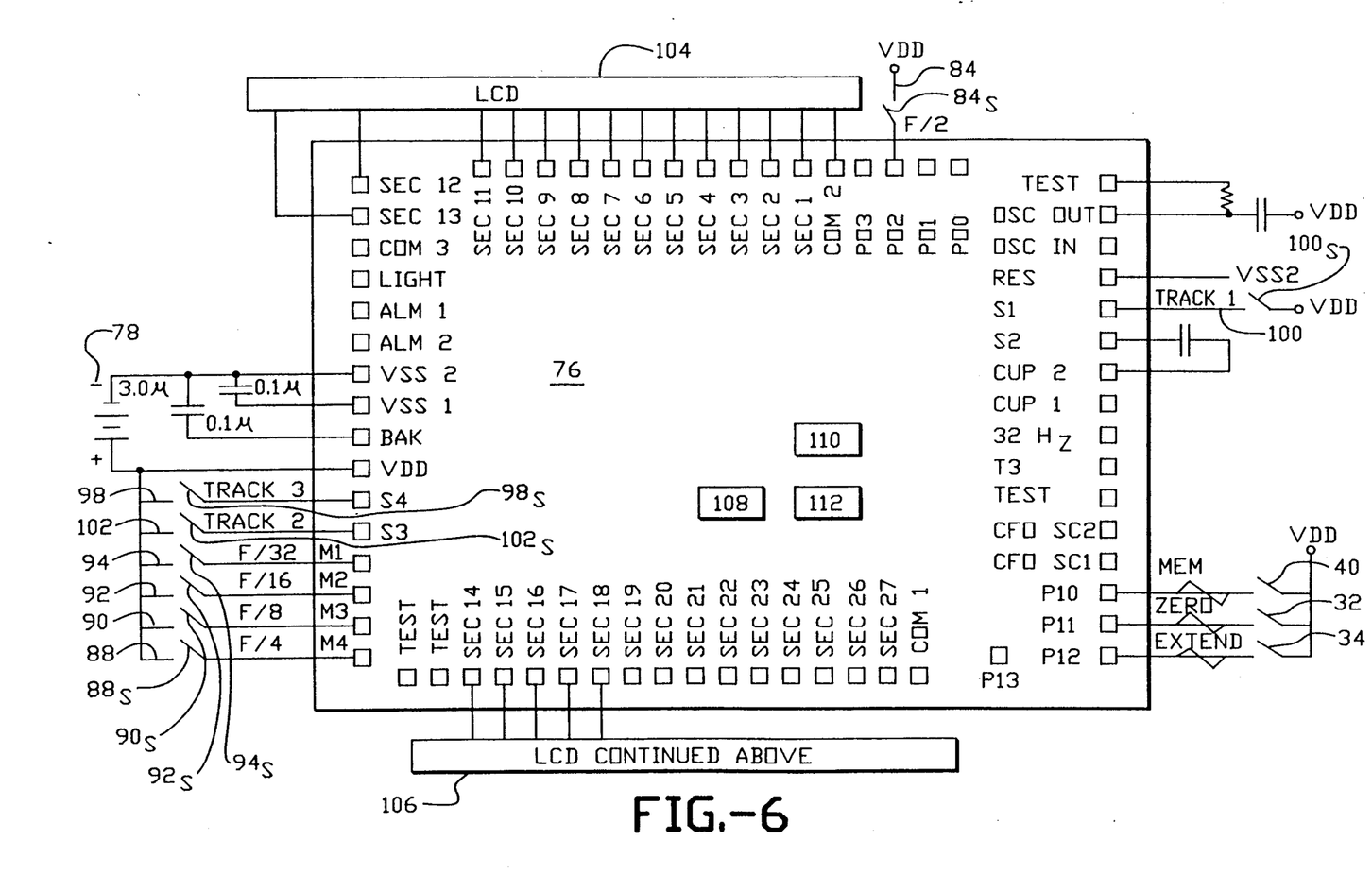
FIG. 6 is an embodiment of a microprocessor of the invention of FIG. 2.

FIG. 6 depicts a schematical representation of the microprocessor 76 of the embodiment of the present invention. It is to be understood that this microprocessor 76 incorporates therein a decoder 108, a memory 110 and a counter 112. In FIG. 6, the above conductors are schematically represented along with the above switches or brushes (collectively 72), with the switches given the same number as a conductors with a "s" following the number. Further, LCD display lines 104 and 106 are shown. These display lines drive display of window 24. The zero, extend, and memory switch 32, 34, and 40 are also schematically represented.

With respect to the zero switch, it is to be understood that the zero switch is to be pushed prior to the tape being extended from the housing in order to make the reading. If the zero switch is pushed at any time after the tape is extended, the reading will be zeroed and a new reading will be made starting from the position of the tape when the zero switch is pushed to the new position.

Figure 8:
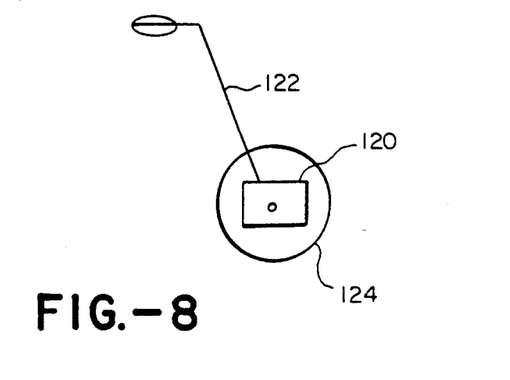
FIG. 8 is an alternative embodiment of the invention.

An alternative embodiment of the invention is shown in FIG. 8. This embodiment is intended for use by one who wishes to make measurements, for example, over a long distance. This embodiment might for example be used when measuring between two points on a roadway or for determining right-of-ways and the like. In this embodiment, the actual measuring arrangement 120 is located at the end of a handle 122. A traction wheel 124 extends from the measurement arrangement 120. The traction wheel engages and causes to turn a capstan such as capstan 58 in the above embodiment. The remainder of this embodiment is similar to the embodiment of tape measure 20. As the arrangement 120 is moved across the surface to be measured, the traction wheel 124 causes the capstan and the remainder of the measuring arrangement 120 to make a measurement much as the measurement of the embodiment of tape measure 20 is accomplished.

Industrial Applicability

The operation of the above invention is as follows. Initially, the tape 26 is retracted inside the housing 22. The zero switch 32 is pushed to zero the display. The brake release button 42 is pushed and the tape is withdrawn from the housing so that the measurement can be made. A measurement is then put on the display 24 and can be saved by pushing the memory switch 40. Further, by pushing the extend button 34, a reading including the length of the tape extracted from the housing, and the length of the housing can be made.

Other objects and advantages of the invention can be obtained by a review of the claims and the figures.

It is to be understood that other embodiments of the present invention can be made and fall within the spirit and scope of this invention.

We claim:

1. An apparatus for making a measurement including:
   a housing;
   a flexible tape;
   means located in said housing for allowing said tape to be retracted into and extended from said housing;
   a capstan;
   means for rotatingly securing said capstan in said housing;
   means for operably engaging said tape with said capstan to cause said capstan to rotate with the retraction of the tape into said housing and the extension of said tape from said housing;
   encoder means for determining movement of said tape;
   said encoder means including a plurality of coded electrical conductors which include an absolute scale and a relative scale, at least some of the coded electrical conductors having different codes;
   said encoder means including electrical switch means for contacting said coded electrical conductors and for causing a signal to be created;
   means for operably coupling said encoder means to said capstan;
   processor means connected to said encoder means for determining a measurement dependant on the signal from the encoder means; and
   means for displaying the measurement.

2. The apparatus of claim 1 wherein said operably engaging means includes perforations provided through said tape and pins extending from the capstan which engage said perforations in order to cause the capstan to rotate as said tape moves.

3. The apparatus of claim 2 wherein:
said perforations are circular in shape and the pins are sufficiently short so that elongated perforations are not required nor are the circular perforations worn into elongate shapes through usage of the tape.

4. The apparatus of claim 1 wherein said absolute scale includes sets of indicia, with only one indicia of each set changing for each location to be determined.

5. The apparatus of claim 1, wherein
said absolute scale includes a Gray Scale.

6. The apparatus of claim 1 wherein said coded electrical conductors are semicircular in shape.

7. An apparatus for making a measurement including:
a housing; a
a flexible tape;
means located in said housing for allowing said tape to be retracted into said extended from said housing;
a capstan;
means for rotatingly securing said capstan in said housing;
means for operably engaging said tape with said capstan to cause said capstan to rotate with the retraction of the tape into said housing and the extension of said tape from said housing;
encoder means for determining movement of said tape and for providing a signal representative of said movement;
said encoder means including an absolute scale and said relative scale;
means for operably coupling said encoder means to said capstan;
processor means connected to said encoder means for determining a measurement dependant on the signal from the encoder means;
means for displaying the measurement.

8. The apparatus of claim 7 wherein:
said operably engaging means includes perforations provided through said tape and pins extending from the capstan which engage said perforations in order to cause the capstan to rotate as said tape moves.

9. The apparatus of claim 8 wherein:
said perforations are circular in shape and the pins are sufficiently short so that elongated perforations are not required nor are the circular perforations worn into elongate shapes through usage of the tape.

10. The apparatus of claim 7 whereby said encoder means includes a switch means for contacting said absolute scale and relative scale for generating said signal.

11. The apparatus of claim 7 wherein said relative scale includes first predetermined intervals, and said absolute scale includes means for determining a location within each of said first predetermined intervals;
said processor means including counter means for counting said first predetermined intervals and decoder means for decoding said absolute scale.

12. The apparatus of claim 7 wherein:
said absolute scale includes a Gray Scale.

13. The apparatus of claim 7 wherein said relative and absolute scales are circular in shape.

14. An apparatus for making a measurement including
a housing
a capstan;
means for rotating securing said capstan in said housing;
means for causing said capstan to rotate so that the measurement can be made;
encoder means for determining movement of said capstan;
said encoder means including a plurality of coded electrical conductors which include an absolute scale and a relative scale, at least some of the coded electrical conductors having different codes;
said encoder means includes electrical switch means for contacting said coded electrical conductors and for causing a signal to be created;
means for operably coupling said encoder means with said capstan;
processor means connected to said encoder means for determining a measurement dependant on the signal from the encoder means; and
means for displaying the measurement.

15. The apparatus of claim 14 wherein said coded electrical conductors of said encoder means include a first scale means for measuring first predetermined intervals, and a second scale means for determining a location within each of said first predetermined intervals;
said processor means including counter means for counting said first predetermined intervals of said first scale means and decoder means for decoding said second scale means.

16. The apparatus of claim 15:
wherein said second scale means includes indicia from absolutely determining a position within each of said first predetermined intervals.

17. The apparatus of claim 14 wherein said absolute scale includes sets of indicia, with only one indicia of each set changing for each location to be determined.

18. The apparatus of claim 14 wherein:
said absolute scale includes a Gray Scale.

19. The apparatus of claim 14 wherein said coded electrical conductors are semicircular in shape.

20. An apparatus for making a measurement including:
a housing;
a capstan;
means for rotably securing said capstan in said housing;
means for causing said capstan to rotate so that the measurement can be made;
encoder means for determining movement of said capstan and for generating a signal dependant on said movement;
said encoder means including an absolute scale and a relative scale;
means for operably coupling said encoder means to said capstan;
processor means connected to said encoder means for determining a measurement dependant on the signal from the encoder means; and
means for displaying the measurement.

21. The apparatus of claim 20 wherein:
said operably engaging means includes perforations provided through said tape and pins extending from the capstan which engage said perforations in order to cause the capstan to rotate as said tape moves.

22. The apparatus of claim 21, wherein:

said perforations are circular in shape and the pins are sufficiently short so that elongated perforations are not required nor are the circular perforations worn into elongate shapes through usage of the tape.

23. The apparatus of claim 22 wherein said encoder means includes switch means for contacting said absolute scale and said relative scale in order to create said signal.

24. The apparatus of claim 20 wherein said relative scale includes first predetermined intervals, and absolute scale includes means for determining a location within said first predetermined intervals;

said processor means including counter means for counting said first predetermined intervals and decoder means for decoding said absolute scale.

25. The apparatus of claim 20 wherein said relative and absolute scales are circular in shape.

26. An apparatus for making a measurement including:
 a housing;
 a flexible tape;
 means located in said housing for allowing said tape to be retracted into and extended from said housing;
 a capstan;
 means for rotatingly securing said capstan in said housing;
 means for operably engaging said tape with said capstan to cause said capstan to rotate with the retraction of the tape into said housing and the extension of said tape from said housing;
 encoder means for determining movement of said tape;
 said encoder means including a plurality of coded electrical conductors, at least some of the coded electrical conductors having different codes;
 wherein said coded electrical conductors of said encoder means includes a first scale means for measuring first predetermined intervals, and a second scale means for determining a location within each of said first predetermined intervals;
 said encoder means including electrical switch means for contacting said coded electrical conductors and for causing a signal to be created;
 means for operably coupling said encoder means to said capstan;
 processor means connected to said encoder means for determining a measurement dependant on the signal from the encoder means;
 wherein said processor means includes counter means for counting said first predetermined intervals of said first scale means and decoder means for decoding said second scale means; and
 means for displaying the measurement.

27. The apparatus of claim 26:
 wherein said second scale means includes indicia for absolutely determining a position within each of said first predetermined intervals.

28. The apparatus of claim 26, wherein said second scale means includes sets of indicia, with only one indicia of each set changing for each location to be determined.

* * * * *